US012632550B2

(12) United States Patent
Fraboni et al.

(10) Patent No.: US 12,632,550 B2
(45) Date of Patent: May 19, 2026

(54) SMART INCENTIVIZATION FOR ACHIEVING COLLABORATIVE MACHINE LEARNING

(71) Applicant: ACCENTURE GLOBAL SOLUTIONS LIMITED, Dublin (IE)

(72) Inventors: Yann Fraboni, Nice (FR); Laura Wendy Hélène Sylvie Angèle Degioanni, Roquefort-les-Pins (FR); Laetitia Kameni, Juan-les-Pins (FR); Richard Vidal, Antibes (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 887 days.

(21) Appl. No.: 17/954,563

(22) Filed: Sep. 28, 2022

(65) Prior Publication Data
US 2024/0037234 A1 Feb. 1, 2024

(30) Foreign Application Priority Data

Jul. 27, 2022 (EP) ..................................... 22306117

(51) Int. Cl.
*G06F 21/56* (2013.01)
*G06N 3/088* (2023.01)

(52) U.S. Cl.
CPC ........... *G06F 21/566* (2013.01); *G06N 3/088* (2013.01)

(58) Field of Classification Search
CPC ...... G06F 21/566; G06N 3/088; G06N 3/045; G06N 7/01; G06N 20/00
See application file for complete search history.

(56) References Cited

U.S. PATENT DOCUMENTS

2020/0380340 A1* 12/2020 Blanchard ............... H04L 9/002
2021/0287114 A1* 9/2021 Zhou ...................... G06N 20/20

OTHER PUBLICATIONS

Tian Li, "Federated Learning: Challenges, Methods, and Future Directions", 2019, CMU, retrieved from https://blog.ml.cmu.edu/2019/11/12/federated-learning-challenges-methods-and-future-directions/ on Jul. 16, 2025 (Year: 2019).*

(Continued)

*Primary Examiner* — Abdullah Al Kawsar
(74) *Attorney, Agent, or Firm* — Mannava & Kang, P.C.

(57) ABSTRACT

Systems and methods for smart incentivization for achieving collaborative machine learning are disclosed. A system receives local model parameters from plurality of client devices in a network, for global model corresponding to collaborative machine learning. The system determines an optimum score for each client device using pre-trained Conditional Variational Auto Encoder (CVAE), based on local model parameter. The system computes contribution score for each client device by determining relative distance value of optimum score corresponding to each client device with optimum score corresponding to another client device from the plurality of client devices, and a global model optimum score of global model. The system updates global model with local model parameter received from the selected set of client devices of the plurality of client devices corresponding to good class, average class, and bad class.

(Continued)

The system outputs grading score, an incentive, importance score for each of selected client devices, and a performance of the global model.

15 Claims, 6 Drawing Sheets

(56) References Cited

OTHER PUBLICATIONS

So et al., "Byzantine-Resilient Secure Federated Learning", 2021, IEEE Journal on Selected Areas in Communications, vol. 39 No. 7, pp. 2168-2181 (Year: 2021).*

Cao et al., "FLTrust: Byzantine-robust Federated Learning via Trust Bootstrapping", Apr. 12, 2022, arXiv, v3, pp. 1-18 (Year: 2022).*

Gu et al., "Detecting Malicious Model Updates from Federated Learning on Conditional Variational Autoencoder", 2021, 2021 IEEE International Parallel and Distributed Processing Symposium (IPDPS), vol. 2021, pp. 671-680 (Year: 2021).*

Yadav et al., "Clustering based Rewarding Algorithm to Detect Adversaries in Federated Machine Learning based IoT Environment", 2021, 2021 IEEE International Conference on Consumer Electronics (ICCE), vol. 2021, pp. 1-6 (Year: 2021).*

Gao et al., "FIFL: A Fair Incentive Mechanism for Federated Learning", 2021, ICPP '21: Proceedings of the 50th International Conference on Parallel Processing, vol. 50 (2021), pp. 1-10 (Year: 2021).*

Pol et al., "Anomaly Detection with Conditional Variational Autoencoders", 2019, 2019 18th IEEE International Conference On Machine Learning And Applications (ICMLA), vol. 18 (2019), pp. 1651-1657 (Year: 2019).*

Shyn et al., "FedCCEA: A Practical Approach of Client Contribution Evaluation for Federated Learning", 2021, arXiv, v1, pp. 1-23 (Year: 2021).*

Cao et al., "Understanding Distributed Poisoning Attack in Federated Learning", 2019, 2019 IEEE 25th International Conference on Parallel and Distributed Systems (ICPADS), vol. 25 (2019), pp. 233-239 (Year: 2019).*

Bhagoji et al., "Analyzing Federated Learning through an Adversarial Lens", 2019, Proceedings of the 36th International Conference on Machine Learning, vol. 36, pp. 1-10 (Year: 2019).*

Jeong et al., "Are You a Good Client? Client Classification in Federated Learning", 2021, 2021 International Conference on Information and Communication Technology Convergence (ICTC), vol. 2021, pp. 1691-1696 (Year: 2021).*

Zaixi Zhang, Xiaoyu Cao, Jinayuan Jia, Neil Zhenqiang Gong; FLDetector: Detecting Malicious Clients in Federated Learning via Checking Model-Updates Consistency, arxiv, Jul. 19, 2022 (Year: 2022).*

* cited by examiner

100

GLOBAL MODEL UPDATING ENGINE 106

INCENTIVE CALCULATING ENGINE 104

PROCESSOR 102

CONDITIONAL VARIATIONAL AUTO ENCODER (CVAE) 108

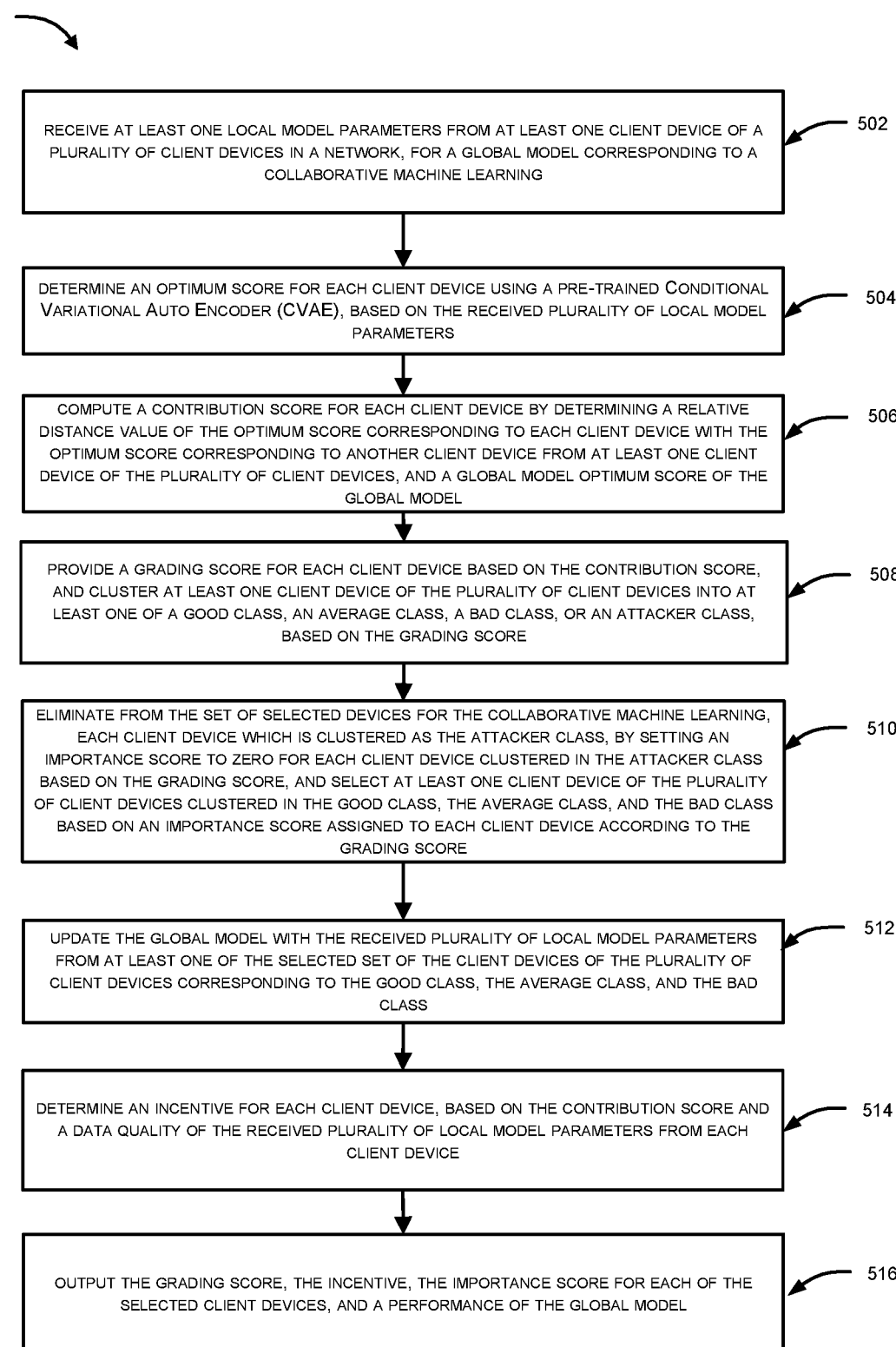

500

RECEIVE AT LEAST ONE LOCAL MODEL PARAMETERS FROM AT LEAST ONE CLIENT DEVICE OF A PLURALITY OF CLIENT DEVICES IN A NETWORK, FOR A GLOBAL MODEL CORRESPONDING TO A COLLABORATIVE MACHINE LEARNING — 502

DETERMINE AN OPTIMUM SCORE FOR EACH CLIENT DEVICE USING A PRE-TRAINED CONDITIONAL VARIATIONAL AUTO ENCODER (CVAE), BASED ON THE RECEIVED PLURALITY OF LOCAL MODEL PARAMETERS — 504

COMPUTE A CONTRIBUTION SCORE FOR EACH CLIENT DEVICE BY DETERMINING A RELATIVE DISTANCE VALUE OF THE OPTIMUM SCORE CORRESPONDING TO EACH CLIENT DEVICE WITH THE OPTIMUM SCORE CORRESPONDING TO ANOTHER CLIENT DEVICE FROM AT LEAST ONE CLIENT DEVICE OF THE PLURALITY OF CLIENT DEVICES, AND A GLOBAL MODEL OPTIMUM SCORE OF THE GLOBAL MODEL — 506

PROVIDE A GRADING SCORE FOR EACH CLIENT DEVICE BASED ON THE CONTRIBUTION SCORE, AND CLUSTER AT LEAST ONE CLIENT DEVICE OF THE PLURALITY OF CLIENT DEVICES INTO AT LEAST ONE OF A GOOD CLASS, AN AVERAGE CLASS, A BAD CLASS, OR AN ATTACKER CLASS, BASED ON THE GRADING SCORE — 508

ELIMINATE FROM THE SET OF SELECTED DEVICES FOR THE COLLABORATIVE MACHINE LEARNING, EACH CLIENT DEVICE WHICH IS CLUSTERED AS THE ATTACKER CLASS, BY SETTING AN IMPORTANCE SCORE TO ZERO FOR EACH CLIENT DEVICE CLUSTERED IN THE ATTACKER CLASS BASED ON THE GRADING SCORE, AND SELECT AT LEAST ONE CLIENT DEVICE OF THE PLURALITY OF CLIENT DEVICES CLUSTERED IN THE GOOD CLASS, THE AVERAGE CLASS, AND THE BAD CLASS BASED ON AN IMPORTANCE SCORE ASSIGNED TO EACH CLIENT DEVICE ACCORDING TO THE GRADING SCORE — 510

UPDATE THE GLOBAL MODEL WITH THE RECEIVED PLURALITY OF LOCAL MODEL PARAMETERS FROM AT LEAST ONE OF THE SELECTED SET OF THE CLIENT DEVICES OF THE PLURALITY OF CLIENT DEVICES CORRESPONDING TO THE GOOD CLASS, THE AVERAGE CLASS, AND THE BAD CLASS — 512

DETERMINE AN INCENTIVE FOR EACH CLIENT DEVICE, BASED ON THE CONTRIBUTION SCORE AND A DATA QUALITY OF THE RECEIVED PLURALITY OF LOCAL MODEL PARAMETERS FROM EACH CLIENT DEVICE — 514

OUTPUT THE GRADING SCORE, THE INCENTIVE, THE IMPORTANCE SCORE FOR EACH OF THE SELECTED CLIENT DEVICES, AND A PERFORMANCE OF THE GLOBAL MODEL — 516

FIG.5

SMART INCENTIVIZATION FOR ACHIEVING COLLABORATIVE MACHINE LEARNING

PRIORITY

The present Non-Provisional Application claims priority to the European Patent Application Serial No. 22306117.7, having a filing date of Jul. 27, 2022, the disclosure of which is hereby incorporated by reference in its entirety.

BACKGROUND

Generally, collaborative learning (for example, federated learning, or any other learning technique where one or more client devices jointly learn a model) is a machine learning technique that trains an algorithm across multiple decentralized edge devices or servers holding local data samples, without exchanging the data samples. Instead of transferring data directly to a centralized data warehouse for building machine learning models, collaborative learning allows each edge device or server to own local data and enables all parties to build a machine learning model together. Additionally, there may be different categories of data contributions from edge devices or servers for collaborative machine learning that may include quality of the dataset, amount of the dataset, and uniqueness of the dataset.

There may be a need to measure the data contribution in order to adopt collaborative learning in any industry. There may be different challenges to measure data contribution. These may include, for example, incentivizing edge devices or servers for participation, paying edge devices or servers according to the relevance of their respective contribution, optimization of the edge devices or servers and related hardware for collaborative learning to be faster and cheaper, allocation of limited bandwidth, computing power and energy to clients, and explanation of the importance given to each edge device or server in a collaborative learned model.

Conventional methods attempt to measure data contribution from the edge devices or servers, using a game theory metric such as Shapley value. However, computation using the Shapley value has exponential complexity, especially for a large number of data samples. Further, computing the Shapley value requires additional training for every sub-dataset. Another conventional method involves measuring the data contribution of participants in Collaborative Machine Learning (CML) by calculating the contributions of multiple parties in CML, in the context of both horizontal CML and vertical CML. Yet another conventional method provides an estimation of individual device contributions for incentivizing federated learning.

However, the above-mentioned methods may require additional computation in centralized learning and may not consider the required time complexity. In addition to participating in the collaborative learning procedure, the edge devices or the servers perform a local processing to obtain a respective optimum model. Such processing for obtaining the optimal model may need to adapt to the changing learning procedure and may require additional computation from the edge devices or the server. Further, some edge devices or the servers may be attackers which poses additional challenges in trusting clients and their computed optimum models.

Therefore, there is a well-felt need for a system and method for addressing at least the above-mentioned problems in the existing approaches to calculate incentives for achieving a collaborative machine learning.

SUMMARY

An embodiment of present disclosure includes a system, the system receives at least one local model parameters from at least one client devices of a plurality of client devices in a network, for a global model corresponding to a collaborative machine learning. The plurality of client devices is initially grouped as a set of selected devices for the collaborative machine learning. Further, the system determines an optimum score for each client device using a pre-trained Conditional Variational Auto Encoder (CVAE), based on the received plurality of local model parameters. Further, the system computes a contribution score for each client device by determining a relative distance value of the optimum score corresponding to each client device with the optimum score corresponding to another client device from the plurality of client devices, and a global model optimum score of the global model. Furthermore, the system provides a grading score for each client device based on the contribution score, and clusters at least one client device of the plurality of client devices into at least one of a good class, an average class, a bad class, or an attacker class, based on the grading score. Further, the system eliminates from the set of selected devices for the collaborative machine learning, each client device which is clustered as the attacker class, by setting an importance score to zero for each client device clustered in the attacker class based on the grading score.

Additionally, the system selects at least one client device of the plurality of client devices clustered in the good class, the average class, and the bad class based on an importance score assigned to each client device according to the grading score. Further, the system updates the global model with the received plurality of local model parameters from at least one of the selected set of client devices of the plurality of client devices corresponding to the good class, the average class, and the bad class. Furthermore, the system determines an incentive for each client device, based on the contribution score and a data quality of the received plurality of local model parameters from each client device. Additionally, the system outputs the grading score, the incentive, the importance score for each of the selected client device, and a performance of the global model. The output is stored and updated each time the global model is updated.

Another embodiment of the present disclosure may include a method, the method includes receiving at least one local model parameters from at least one client device of a plurality of client devices in a network, for a global model corresponding to a collaborative machine learning. The plurality of client devices may initially be grouped as a set of selected devices for the collaborative machine learning. Further, the method includes determining an optimum score for each client device using a pre-trained Conditional Variational Auto Encoder (CVAE), based on the received plurality of local model parameters. Further, the method includes computing a contribution score for each client device by determining a relative distance value of the optimum score corresponding to each client device with the optimum score corresponding to another client device from at least one client device of the plurality of client devices, and a global model optimum score of the global model. Furthermore, the method includes providing a grading score for each client device based on the contribution score, and clusters at least one client device of the plurality of client devices into at least one of a good class, an average class, a bad class, and an attacker class, based on the grading score. Further, the method includes eliminating from the set of selected devices for the collaborative machine learning, each client device which is clustered as the attacker class, by setting an importance score to zero for each client device clustered in the attacker class based on the grading score.

Additionally, the method includes selecting at least one client device of the plurality of client devices clustered in the good class, the average class, and the bad class based on an importance score assigned to each client device according to the grading score. Further, the method includes updating the global model with the received plurality of local model parameters from at least one of the selected set of client devices of the plurality of client devices corresponding to the good class, the average class, and the bad class. Furthermore, the method includes determining an incentive for each client device, based on the contribution score and a data quality of the received plurality of local model parameters from each client device. Additionally, the method includes outputting the grading score, the incentive, the importance score for each of the selected client device, and a performance of the global model. The output is stored and updated each time the global model is updated.

Yet another embodiment of the present disclosure may include a non-transitory computer-readable medium comprising machine-executable instructions that may be executable by a processor to receive at least one local model parameters from at least one client device of a plurality of client devices in a network, for a global model corresponding to a collaborative machine learning. The plurality of client devices may initially be grouped as a set of selected devices for the collaborative machine learning. Further, the processor determines an optimum score for each client device using a pre-trained Conditional Variational Auto Encoder (CVAE), based on the received plurality of local model parameters. Further, the processor computes a contribution score for each client device by determining a relative distance value of the optimum score corresponding to each client device with the optimum score corresponding to another client device from at least one client device of the plurality of client devices, and a global model optimum score of the global model. Furthermore, the processor provides a grading score for each client device based on the contribution score, and clusters at least one client device of the plurality of client devices into at least one of, a good class, an average class, a bad class, and an attacker class, based on the grading score. Further, the processor eliminates from the set of selected devices for the collaborative machine learning, each client device which is clustered as the attacker class, by setting an importance score to zero for each client device clustered in the attacker class based on the grading score.

Additionally, the processor selects at least one client device of the plurality of client devices clustered in the good class, the average class, and the bad class based on an importance score assigned to each client device according to the grading score. Further, the processor updates the global model with the received plurality of local model parameters from at least one of the selected set of client device of the plurality of client devices corresponding to the good class, the average class, and the bad class. Furthermore, the processor determines an incentive for each client device, based on the contribution score and a data quality of the received plurality of local model parameters from each client device. Additionally, the processor outputs the grading score, the incentive, the importance score for each of the selected client device, and a performance of the global model. The output is stored and updated each time the global model is updated.

BRIEF DESCRIPTION OF DRAWINGS

FIG. 5 illustrates a flow chart depicting a method of calculating incentives for a collaborative machine learning, according to an example embodiment of the present disclosure.

DETAILED DESCRIPTION

Figure 1:
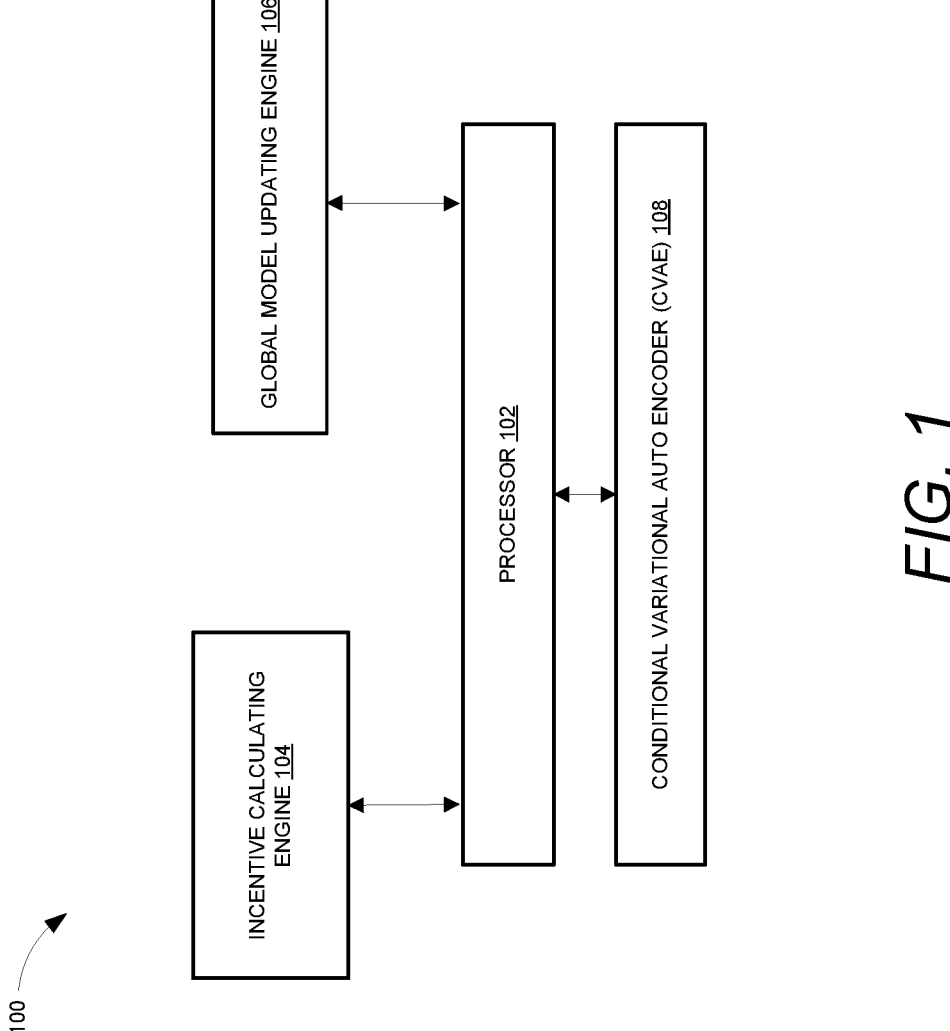
FIG. 1 illustrates a system for calculating incentives for a collaborative machine learning, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Various embodiments describe a system and a method for smart incentivization for achieving collaborative machine learning, The system receives at least one local model parameters from at least one client device of a plurality of client devices in a network, for a global model corresponding to a collaborative machine learning. The plurality of client devices is initially grouped as a set of selected devices for the collaborative machine learning. Further, the system determines an optimum score for each client device using a pre-trained Conditional Variational Auto Encoder (CVAE), based on the received plurality of local model parameters. Further, the system computes a contribution score for each client device by determining a relative distance value of the optimum score corresponding to each client device with the optimum score corresponding to another client device from at least one client device of the plurality of client devices, and a global model optimum score of the global model. Furthermore, the system provides a grading score for each client device based on the contribution score, and clusters the plurality of client devices into at least one of a good class, an average class, a bad class, and an attacker class, based on the grading score. Further, the system eliminates from the set of selected devices for the collaborative machine learning, each client device which is clustered as the attacker class, by setting an importance score to zero for each client device clustered in the attacker class based on the grading score.

Additionally, the system selects at least one client device of the plurality of client devices clustered in the good class, the average class, and the bad class based on an importance score assigned to each client device according to the grading score. Further, the system updates the global model with the received plurality of local model parameters from at least one of the selected set of client devices of the plurality of client devices corresponding to the good class, the average class, and the bad class. Furthermore, the system determines an incentive for each client device, based on the contribution score and a data quality of the received plurality of local model parameters from each client device. Additionally, the system outputs the grading score, the incentive, the importance score for each of the selected client device, and a performance of the global model. The output is stored and updated each time the global model is updated.

Embodiments disclosed herein may provide smart incentive calculations for achieving collaborative machine learning. The plurality of client devices may be rewarded on a real-time basis based on the relevance of data contribution from each of the plurality of client devices. The present disclosure may detect attackers, and freeloaders, in the plurality of client devices, which provide poor data quality. The present disclosure optimizes the learning process with better computing and resource allocation. The present disclosure uses a Conditional Variational Auto Encoder (CVAE) to obtain each data sample optimum of each client device to measure a sample contribution of each client device. The present disclosure requires to train only the CVAE with a history of client local models, a history of global models, and indices of client devices. Therefore, the present disclosure may not require clients/server communication and is thus not impacted by client devices and server hardware constraints. For instance, the server alone may train the CVAE, and no communication may be needed between the server and the client devices. The information needed to train the CVAE may be collected during the training (local model parameters from client devices, global models, and the like) or the information may be determined from a client device ID/client index.

FIG. 1 illustrates a system 100 for calculating incentives for a collaborative machine learning, according to an example embodiment of the present disclosure. The system 100 may be implemented by way of a single device or a combination of multiple devices that may be operatively connected or networked together. The system 100 may be implemented in hardware or a suitable combination of hardware and software. The system 100 includes a processor 102. The system 100 may include an incentive calculating engine 104, a global model updating engine 106, and a Conditional Variational Auto Encoder (CVAE) 108.

The system 100 may be a hardware device including the processor 102 executing machine-readable program instructions/processor-executable instructions to calculate incentives for the collaborative learning. Execution of the machine-readable program instructions by the processor 102 may enable the proposed system 100 to achieve incentive calculation for the collaborative machine learning. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute processor-readable instructions in a memory operationally coupled with the system 100 for performing tasks such as data processing, input/output processing, and/or any other functions. Any reference to a task in the present disclosure may refer to an operation being or that may be performed on data.

In an example embodiment, the processor 102 may receive at least one local model parameters from at least one client device of a plurality of client devices in a network, for a global model corresponding to a collaborative machine learning. The local model parameters may be a set of parameters local to each of the plurality of client devices in a network, based on which the collaborative machine learning is achieved for building a global model. The global model may be a collaborative learned model, based on the received plurality of local model parameters from the plurality of client devices. The plurality of client devices may include, but are not limited to, laptops, desktops, servers, digital assistants, virtual assistants, Internet of Things (IoT) devices, mobile phones, wearable devices, smart home appliances, and the like. The plurality of client devices may be locally or remotely located, and communicatively coupled through common or multiple networks. The network may be a wired communication network and/or a wireless communication network.

In an example embodiment, the plurality of client devices may initially be grouped as a set of selected devices for the collaborative machine learning. The plurality of client devices may be selected for the collaborative machine learning, based on a plurality of parameters included in the local model parameters. The parameters may include, but are not limited to, a current local model parameter, a quality of the dataset, an amount of the dataset, a uniqueness of the dataset, a historically received local model parameter, and the like. The local model parameter can be considered from the set of selected devices and is used for the collaborative machine learning. In an example embodiment, uniqueness of the dataset of the local model parameters may be directly proportional to the relative distance of a given client device from other client devices of the plurality of clinet devices.

In an example embodiment, the processor 102 may determine an optimum score for each client device using a pre-trained Conditional Variational Auto Encoder (CVAE) 108, based on the received plurality of local model parameters. The optimum score is a local optimum score of a local model comprising local model parameters, which is received from at least one client device. The optimum score may be a score of the local model which is performing the best for client data. In an example embodiment, the CVAE 108 may be pre-trained using at least one of, a learned model, historic data from each client device of the plurality of client devices, updates/updated local model parameters from each client device, and historic data associated with the global model, and indices associated with each client device. In an example embodiment, the CVAE 108 may be pre-trained iteratively until no client device corresponding to the attacker class (no attacker class) exists in at least one client device of the plurality of client devices. The global model may be updated, when there are no client devices corresponding to the attacker class (no attacker class) in the plurality of client devices.

In an example embodiment, the processor 102 may compute a contribution score for each client device by determining a relative distance value of the optimum score corresponding to each client device with the optimum score corresponding to another client device from at least one client device of the plurality of client devices, and a global optimum score of the global model. In an example embodiment, the contribution score may vary for each client device. The contribution score may depend on a dataset received through the local model parameters, a quality of the dataset, an amount of the dataset, and a uniqueness of the dataset.

In an example embodiment, the processor 102 may provide a grading score for each client device based on the contribution score. The grading score for each client device may be provided in decreasing order of contribution score. In an example embodiment, the processor 102 may cluster at least one client device of the plurality of client devices into at least one of a good class, an average class, a bad class, or an attacker class, based on the grading score. For example, each of the client devices of the plurality of client devices can have the same data quality, and each client device may have good data. Further, no client device may be an attacker or include bad data quality. Hence, for example, all the client devices can be in the same class such as good class, or client devices can be a good class and attacker class. In an example embodiment, the processor 102 may eliminate from the set of selected devices for the collaborative machine learning, each client device which may be clustered as the attacker class, by setting an importance score to zero for each client device clustered in the attacker class based on the grading score. In an example embodiment, each client device is initially assigned with an identical importance score. The importance score for the plurality of client devices clustered in the good class, the average class, and the bad class are assigned based on the data quality of the received plurality of local model parameters. The importance score of the plurality of client devices may be inversely proportional to the contribution score of each client device.

In an example embodiment, the processor 102 may select at least one client device of the plurality of client devices clustered in the good class, the average class, and the bad class based on an importance score assigned to each client device according to the grading score. In an example embodiment, the processor 102 may execute the global model updating engine 106 to update the global model with the received plurality of local model parameters from at least one of the selected set of the client devices of the plurality of client devices corresponding to the good class, the average class, or the bad class. In an example embodiment, the processor 102 may execute the incentive calculating engine 104 to determine an incentive for each client device, based on the contribution score and a data quality of the received plurality of local model parameters from each client device. In an example embodiment, the processor 102 may output the grading score, the incentive, the importance score for each of the selected client device, and a performance of the global model. The output may be stored and updated each time the global model is updated.

Figure 2:
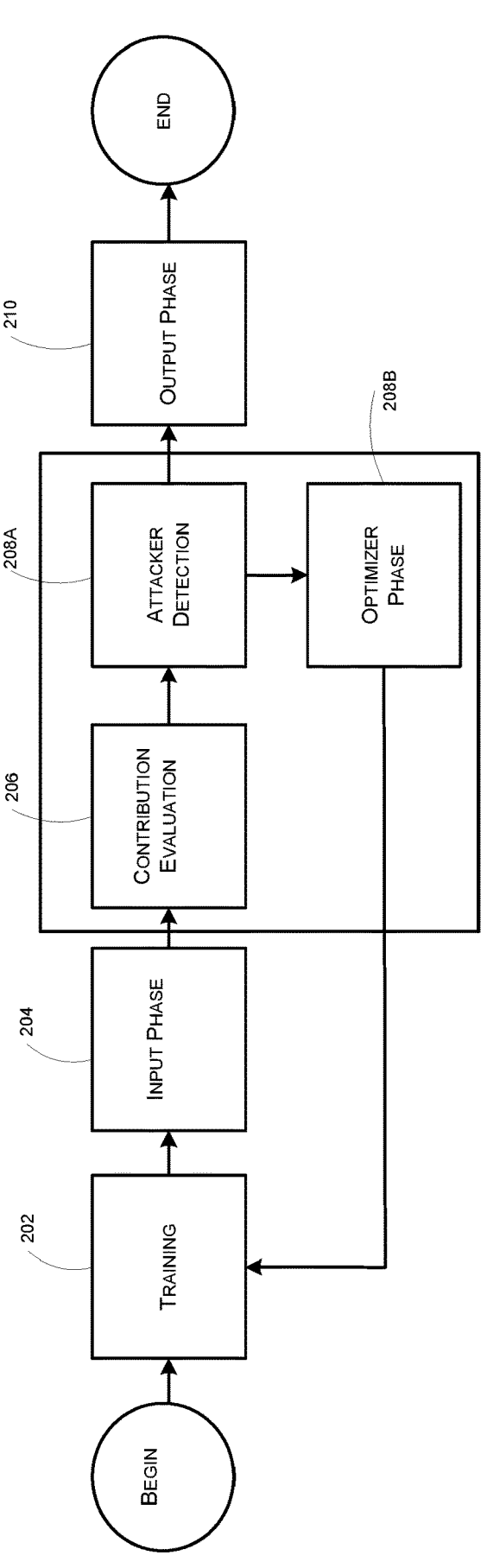
FIG. 2 illustrates an example flow diagram of a method for measuring data contribution from at least one client device of a plurality of client devices for a collaborative machine learning, according to an example embodiment of the present disclosure.

FIG. 2 illustrates an example flow diagram of a method for measuring data contribution from at least one client device of a plurality of client devices for the collaborative machine learning, according to an example embodiment of the present disclosure.

At step 202, the method may include training, by the processor 102, respective local model (i.e., client model) by each of the plurality of client devices. The processor 102 may receive the local model parameter from each of the plurality of client devices. At step 204, the method may include receiving, by the processor 102, the local model parameter to update the global model. To update the global model, the processor 102 may need one or more of the inputs saved during the previous learning process iteration. The inputs include, but are not limited to a learned model, historic data from each of the client device of the plurality of client devices, updates/updated local model parameters from each of the client devices, historic data associated with the global model, and indices associated with each client device, and the like.

The method may include retrieving, by the processor 102, from the CVAE 108, the optimum score of each client device. At step 206, the method may include, by the processor 102, computing the contribution score of each client device. To compute a contribution score for each client device, the method includes determining a relative distance value of the optimum score corresponding to each client device with the optimum score corresponding to another client device from at least one client device of the plurality of client devices, and a global model optimum score of the global model. For example, the client device may be ranked in decreasing order of contribution of the data.

For example, after the collaborative machine learning process, the processor 102 may train the CVAE 108 for predicting the client contribution based on the received global model and the indices associated with each client device. For training of the CVAE, each client device which implements Machine Learning (ML) training, may be provided with an Identity (ID). The client ID may be converted into a unique integer known as indices, which may be different for each client device. Further, using the iteratively trained CVAE 108, the processor 102 can infer the optimum score for each client device. For example, the client devices can be ranked based on their distance of contribution score with respect to the global model. The local model may be robust, when the client devices include a highest relative distance from the global model optimum score of the global model, and include unique local parameters. For example, based on one or more inputs to the CVAE 108 such as a global model '$\theta^{t'}$', a client index '", the CVAE 108 may calculate latent space 'z', using the global model '$\theta^{t'}$', the client index '", to provide client contribution model $$'\theta_i^{t+1}',$$

as the output.

The processor 102 may receive learned model '$\theta^*$' from at least one client device of the plurality of client devices and the CVAE 108 may calculate optimum '$\theta^*_i$' of each client device. The learned model '$\theta^*$' may include the plurality of local model parameters. The processor 102 may compute distance of each client device with respect to other client devices, as in equation 1:

$$d_i = \sum_{j=1}^{n} d(\theta_j^*, \theta_i^*) \qquad \text{Equation 1}$$

Finally, a client contribution is calculated using equation 2, $$c_i = 1 - d_i / \sum_{i=1}^{n} d_i \qquad \text{Equation 2}$$

For example, if an exemplary client device tries to corrupt the learned model '$\theta$*', then the exemplary client device may include the highest relative distance (calculated using the equation 1), and therefore a less client contribution (calculated using the equation 2). Each client device may be provided with a contribution score. The contribution score is inversely proportional to the distance between a client local model optimum score and the global model optimum score. As such, the higher the contribution score and the better a clien's dataset is to the server, e.g., few data samples or poor-quality data. The wealth of a data sample may include different factors, for example, the data can be rare or even unique, and have taken a lot of time to collect. While poor data quality can be from poor data collection, noised data, biased data. In an example scenario, consider 30 client devices including 3 attackers, 5 with poor data quality, 3 with good data quality, while remaining client devices include average data quality. The processor 102 computes, using the CVAE 108, an optimum score $$\theta_i^*$$

for each client device to measure the client contribution '$c_i$'. These contributions range from 0 to 1 which enables plotting a one-Dimensional (1D) figure. The below table 1 provides an example scenario of client devices including attackers, client devices with poor quality data, averaged quality data, and good quality data.

TABLE 1

| Client ID | Contribution value | Class |
|---|---|---|
| 1005 | 9.70830625e−01 | Good |
| 1030 | 7.93129754e−01 | Good |
| . . . | . . . | . . . |
| 1002 | 6.53486946e−01 | Average |
| . . . | . . . | . . . |
| 1015 | 4.07316461e−01 | Bad |
| 1026 | 2.48357077e−02 | Bad |
| . . . | . . . | . . . |
| 1009 | 6.91321506e−03 | Attacker |

At step 208A, the method may include clustering, by the processor 102, client devices according to their contribution value, by using the client device contribution value. The clusters may be used to remove attackers from the set of selected client devices for the collaborative learning process based on identifying the data quality of the selected client devices (i.e., data contributors for the global model).

At step 208B, the method may include setting, by the processor 102, importance score to zero for each client device clustered in the attacker class based on the grading score, and selecting at least one client device of the plurality of client devices clustered in the good class, the average class, and the bad class with good quality data.

At step 210, when no attackers class are detected, the method may include updating, by the processor 102, the global model with the received plurality of local model parameters from at least one of the selected set of client devices of the plurality of client devices corresponding to the good class, the average class, and the bad class. Further, the method includes determining, by the processor 102, an incentive for each client device, based on the contribution score and a data quality of the received plurality of local model parameters from each client device. Furthermore, the method includes outputting, by the processor 102, the incentive, the importance score for each of the selected client device, and a performance of the global model. The output may be stored and updated each time the global model is updated.

Figures 3A, 3B:
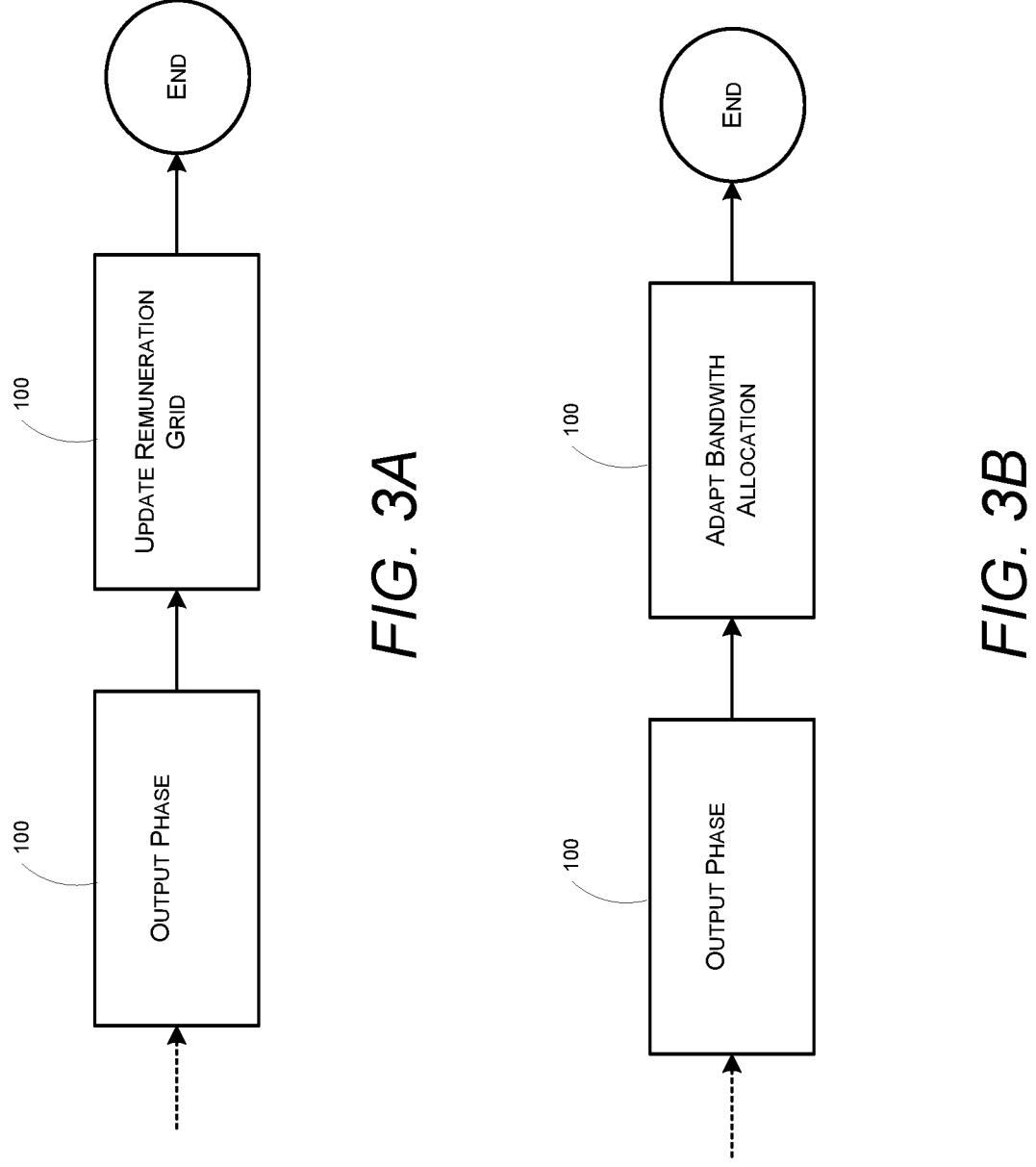
FIGS. 3A, 3B, and 3C illustrate example flow diagrams of exemplary scenarios including a remuneration grid update, an adapt bandwidth allocation, and an explainable Artificial Intelligence (AI), respectively, according to an example embodiment of the present disclosure.
Figure 3C:
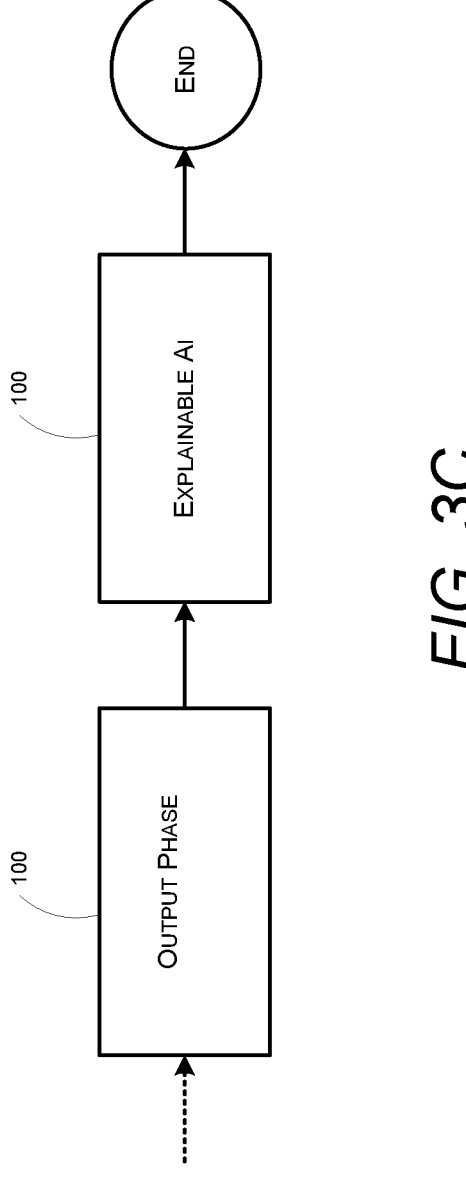

FIGS. 3A, 3B, and 3C illustrate example flow diagrams of exemplary scenarios including a remuneration grid update, an adapt bandwidth allocation, and an explainable Artificial Intelligence (AI), respectively, according to an example embodiment of the present disclosure.

As shown in FIG. 3A, using each client contribution value and relative amount of data, the processor 102 may estimate the percentage of the incentive for each client device. In another example, as shown in FIG. 3B, with the summary of the importance score of the plurality of client devices in the global model, the processor 102 may provide client device-specific bandwidth for a faster collaborative learning process. For example, the processor 102 may provide more bandwidth for contributors with data of good quality, and provide less bandwidth for the ones with data of poor quality.

In yet another example, as shown in FIG. 3C, at the output, the global model may be trained in a collaborative setting, where the client devices may be accounted for in the optimization problem based on their data quality, e.g., removal of attackers. Further, based on determining importance score for each client device, the processor 102 may provide an explanation of the global model, its performances, and how each client is accounted for the data contribution to the global model. The client devices may not change their behavior or increase the computation load. However, the additional computation workload may be provided to the processor 102.

Figure 4:
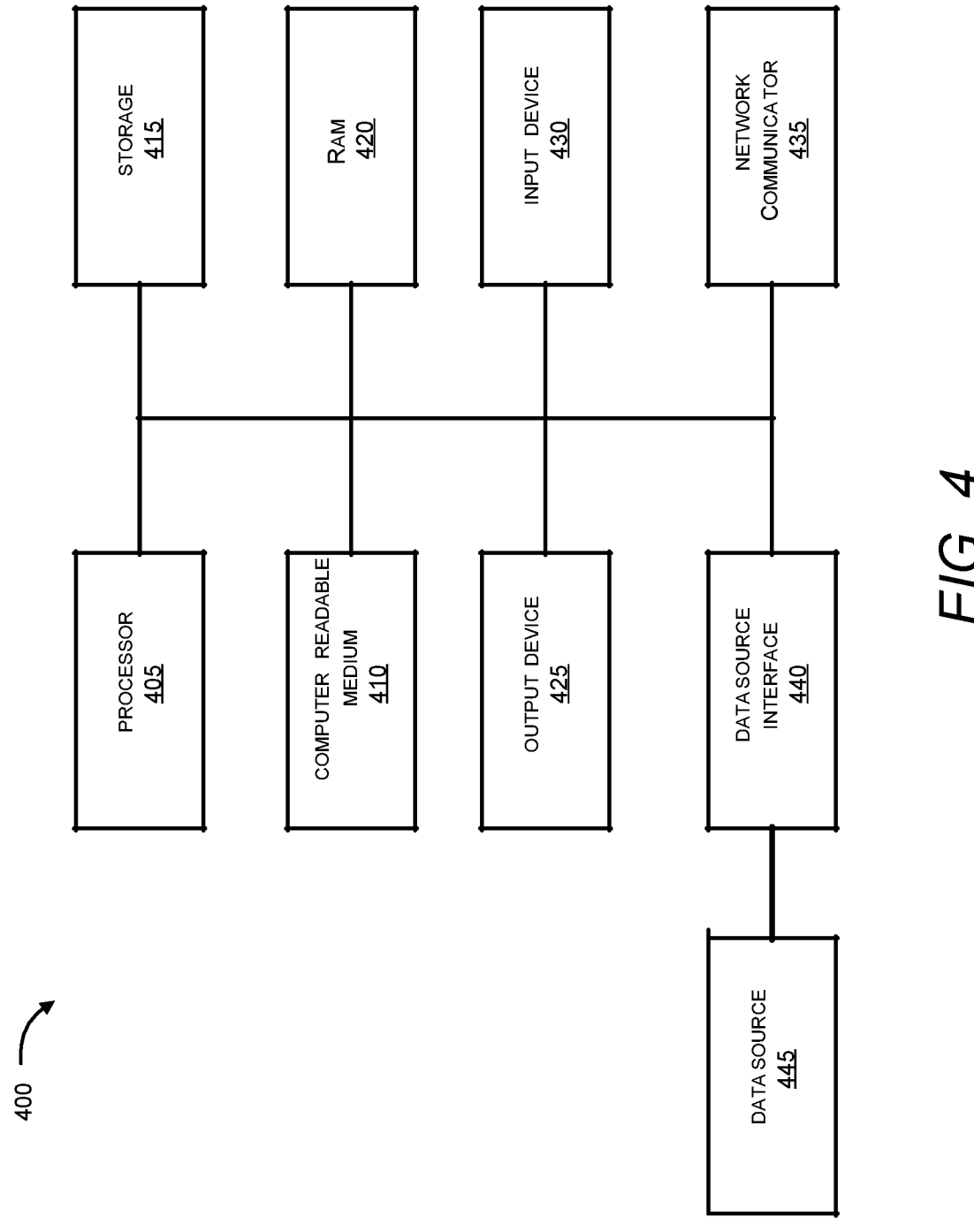
FIG. 4 illustrates a hardware platform for an implementation of the disclosed system, according to an example embodiment of the present disclosure.

FIG. 4 illustrates a hardware platform 400 for implementation of the disclosed system 100, according to an example embodiment of the present disclosure. For the sake of brevity, the construction, and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 400. As illustrated, the hardware platform 400 may include additional components not shown, and some of the components described may be removed and/or modified. For example, a computer system with multiple GPUs may be located on external-cloud platforms including Amazon Web Services, or internal corporate cloud computing clusters, or organizational computing resources.

The hardware platform 400 may be a computer system such as the system 100 that may be used with the embodiments described herein. The computer system may represent a computational platform that includes components that may be in a server or another computer system. The computer system may execute, by the processor 405 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 405 that executes software instructions or code stored on a non-transitory computer-readable storage medium 410 to perform methods of the present disclosure. The software code includes, for example, instructions to gather data and documents and analyze documents.

The instructions on the computer-readable storage medium 410 are read and stored the instructions in storage 415 or in random access memory (RAM). The storage 415 may provide a space for keeping static data where at least some instructions could be stored for later execution. The stored instructions may be further compiled to generate other representations of the instructions and dynamically stored in the RAM such as RAM 420. The processor 405 may read instructions from the RAM 420 and perform actions as instructed.

The computer system may further include the output device 425 to provide at least some of the results of the execution as output including, but not limited to, visual information to users, such as external agents. The output device 425 may include a display on computing devices and virtual reality glasses. For example, the display may be a mobile phone screen or a laptop screen. GUIs and/or text may be presented as an output on the display screen. The computer system may further include an input device 430 to provide a user or another device with mechanisms for entering data and/or otherwise interact with the computer system. The input device 430 may include, for example, a keyboard, a keypad, a mouse, or a touchscreen. Each of these output devices 425 and input device 430 may be joined by one or more additional peripherals. For example, the output device 425 may be used to display the results such as bot responses by the executable chatbot.

A network communicator 435 may be provided to connect the computer system to a network and in turn to other devices connected to the network including other clients, servers, data stores, and interfaces, for example. A network communicator 435 may include, for example, a network adapter such as a LAN adapter or a wireless adapter. The computer system may include a data sources interface 440 to access the data source 445. The data source 445 may be an information resource. As an example, a database of exceptions and rules may be provided as the data source 445. Moreover, knowledge repositories and curated data may be other examples of the data source 445.

FIG. 5 illustrates a flow chart depicting a method of calculating incentive to achieve the collaborative machine learning, according to an example embodiment of the present disclosure.

At block 502, the method 500 may include receiving, by the processor 102 associated with the system 100, at least one local model parameters from at least one client device of a plurality of client devices in a network, for a global model corresponding to a collaborative machine learning. The plurality of client devices is initially grouped as a set of selected devices for the collaborative machine learning.

At block 504, the method 500 may include determining, by the processor 102, an optimum score for each client device using a pre-trained Conditional Variational Auto Encoder (CVAE), based on the received plurality of local model parameters.

At block 506, the method 500 may include computing, by the processor 102, a contribution score for each client device, by determining a relative distance value of the optimum score corresponding to each client device with the optimum score corresponding to another client device from at least one client device of the plurality of client devices, and a global model optimum score of the global model.

At block 508, the method 500 may include providing, by the processor 102, a grading score for each client device based on the contribution score, and clustering at least one client device of the plurality of client devices into at least one of a good class, an average class, a bad class, or an attacker class, based on the grading score.

At block 510, the method 500 may include eliminating, by the processor 102, from the set of selected client devices for the collaborative machine learning, each client device which is clustered as the attacker class, by setting an importance score to zero for each client device clustered in the attacker class based on the grading score. Further, the method 500 includes selecting, by the processor 102, the importance score for the plurality of client devices clustered in the good class, the average class, and the bad class based on an importance score assigned to each client device according to the grading score.

At block 512, the method 500 may include updating, by the processor 102, the global model with the received plurality of local model parameters from at least one of the selected set of the client devices of the plurality of client devices corresponding to the good class, the average class, and the bad class.

At block 514, the method 500 may include determining, by the processor 102, an incentive for each client device, based on the contribution score and a data quality of the received plurality of local model parameters from each client device.

At block 516, the method 500 may include outputting, by the processor 102, the grading score, the incentive, the importance score for each of the selected client devices, and a performance of the global model, wherein the output is stored and updated each time the global model is updated by the processor 102.

The order in which the method 500 is described is not intended to be construed as a limitation, and any number of the described method blocks may be combined or otherwise performed in any order to implement the method 500 or an alternate method. Additionally, individual blocks may be deleted from the method 500 without departing from the spirit and scope of the present disclosure described herein. Furthermore, the method 500 may be implemented in any suitable hardware, software, firmware, or a combination thereof, that exists in the related art or that is later developed. The method 500 describes, without limitation, the implementation of the system 100. A person of skill in the art will understand that method 500 may be modified appropriately for implementation in various manners without departing from the scope and spirit of the disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

13

14

We claim:

1. A system comprising:

a processor; and a memory coupled to the processor, wherein the memory comprises processor-executable instructions, which on execution, causes the processor to:

train a Conditional Variational Auto Encoder (CVAE) using training data that includes historic data of at least one client device of a plurality of client devices in a network, updated local model parameters from each of the plurality of client devices, historic data associated with a global model and indices associated with each of the plurality of client devices;

receive at least one local model parameters from at least one client device of the plurality of client devices in the network, for the global model corresponding to a collaborative machine learning, wherein the plurality of client devices is initially grouped as a set of selected devices for the collaborative machine learning;

determine an optimum score for each client device using the trained Conditional Variational Auto Encoder (CVAE), based on the received plurality of local model parameters, wherein the optimum score is a measure of contribution of the type of dataset to a server by each of the plurality of client devices;

compute a contribution score for each client device by determining a relative distance value of the optimum score corresponding to each client device with the optimum score corresponding to another client device from at least one client device of the plurality of client devices, and a global model optimum score of the global model;

provide a grading score for each client device based on the contribution score, and cluster at least one client device of the plurality of client devices into at least one of a good class, an average class, a bad class, or an attacker class, based on the grading score;

eliminate from the set of selected devices for the collaborative machine learning, each client device which is clustered as the attacker class, by setting an importance score to zero for each client device clustered in the attacker class based on the grading score, and select at least one client device of the plurality of client devices clustered in the good class, the average class, and the bad class based on an importance score assigned to each client device according to the grading score;

update the global model with the received plurality of local model parameters from at least one of the selected set of client devices of the plurality of client devices corresponding to the good class, the average class, and the bad class;

determine an incentive for each client device, based on the contribution score and a data quality of the received plurality of local model parameters from each client device; and output the grading score, the incentive, the importance score for each of the selected client devices, and a performance of the global model, wherein the output is stored and updated each time the global model is updated, wherein the CVAE is trained iteratively until there is no attackers class in the plurality of client devices, and the global model is updated, when there is no attackers class in the plurality of client devices.

2. The system as claimed in claim 1, wherein the importance score for the plurality of client devices clustered in the good class, the average class, and the bad class is assigned based on the data quality of the received plurality of local model parameters.

3. The system as claimed in claim 1, wherein each client device is initially assigned with an identical importance score.

4. The system as claimed in claim 1, wherein the contribution score varies for each client device, and the contribution score depends on a dataset received through the local model parameters, a quality of the dataset, an amount of the dataset, and a uniqueness of the dataset.

5. The system as claimed in claim 1, wherein the grading score for each client device of the plurality of client devices is provided in decreasing order of contribution score.

6. The system as claimed in claim 1, wherein the importance score of the plurality of client devices is inverse of the contribution score of each client device.

7. The system as claimed in claim 1, wherein a uniqueness of the local model parameters is directly proportional to the relative distance of a given client device from other client devices of the plurality of client devices.

8. A method comprising:

training a Conditional Variational Auto Encoder (CVAE) using training data that includes historic data of at least one client device of a plurality of client devices in a network, updated local model parameters from each of the plurality of client devices, historic data associated with a global model, and indices associated with each of the plurality of client devices;

receiving, by a processor associated with a system, at least one local model parameters from at least one client device of the plurality of client devices in the network, for the global model corresponding to a collaborative machine learning, wherein the plurality of client devices is initially grouped as a set of selected devices for the collaborative machine learning;

determining, by the processor, an optimum score for each client device using the trained Conditional Variational Auto Encoder (CVAE), based on the received plurality of local model parameters, wherein the optimum score is a measure of contribution of the type of dataset to a server by each of the plurality of client devices;

compute, by the processor, a contribution score for each client device, by determining a relative distance value of the optimum score corresponding to each client device with the optimum score corresponding to another client device from at least one client device of the plurality of client devices, and a global model optimum score of the global model;

providing, by the processor, a grading score for each client device based on the contribution score, and clustering at least one client device of the plurality of client devices into at least one of a good class, an average class, a bad class, or an attacker class, based on the grading score;

eliminating, by the processor, from the set of selected client devices for the collaborative machine learning, each client device which is clustered as the attacker class, by setting an importance score to zero for each client device clustered in the attacker class based on the grading score, and selecting the importance score for the plurality of client devices clustered in the good class, the average class, and the bad class based on an importance score assigned to each client device according to the grading score;

updating, by the processor, the global model with the received plurality of local model parameters from at least one of the selected set of the client devices of the plurality of client devices corresponding to the good class, the average class, and the bad class;

determining, by the processor, an incentive for each client device, based on the contribution score and a data quality of the received plurality of local model parameters from each client device; and outputting, by the processor, the grading score, the incentive, the importance score for each of the selected client devices, and a performance of the global model, wherein the output is stored and updated each time the global model is updated, wherein the CVAE is trained iteratively until there is no attackers class in the plurality of client devices, and the global model is updated, when there is no attackers class in the plurality of client devices.

9. The method as claimed in claim 8, wherein the importance score for the plurality of client devices clustered in the good class, the average class, and the bad class is assigned based on the data quality of the received plurality of local model parameters.

10. The method as claimed in claim 8, wherein each client device of the plurality of client devices is initially assigned with an identical importance score.

11. The method as claimed in claim 8, wherein the contribution score varies for each client device, and the contribution score depends on a dataset received through the local model parameters, a quality of the dataset, an amount of the dataset, and a uniqueness of the dataset.

12. The method as claimed in claim 8, wherein the grading score for each client device is provided in decreasing order of contribution score.

13. The method as claimed in claim 8, wherein the importance score of the plurality of client devices is inverse of the contribution score of each client device.

14. The method as claimed in claim 8, wherein a uniqueness of the local model parameters is directly proportional to the relative distance of a given client device from other client devices of the plurality of client devices.

15. A non-transitory computer-readable medium comprising machine-executable instructions, which are executable by a processor to:

train a Conditional Variational Auto Encoder (CVAE) using training data that includes historic data of at least one client device of a plurality of client devices in a network, updates local model parameters from each of the plurality of client devices, historic data associated with a global model, and indices associated with each of the plurality of the client devices;

receive at least one local model parameters from at least one client device of the plurality of client devices in the network, for the global model corresponding to a collaborative machine learning, wherein the plurality of client devices is grouped as a set of selected devices for the collaborative machine learning;

determine an optimum score for each client device using the trained Conditional Variational Auto Encoder (CVAE), based on the received plurality of local model parameters, wherein the optimum score is a measure of contribution of the type of dataset to a server by each client devices, wherein the optimum score is a measure of contribution of the type of dataset to a server by each of the plurality of client devices;

compute a contribution score for each client device, by determining a relative distance value of the optimum score corresponding to each client device with the optimum score corresponding to another client device from at least one client device of the plurality of client devices, and a global model optimum score of the global model;

provide a grading score for each client device based on the contribution score, and cluster at least one client device of the plurality of client devices into at least one of a good class, an average class, a bad class, or an attacker class, based on the grading score;

eliminate from the set of selected client devices for the collaborative machine learning, each client device which is clustered as the attacker class, by setting an importance score to zero for each client device clustered in the attacker class based on the grading score, and select at least one client device of the plurality of client devices clustered in the good class, the average class, and the bad class based on an importance score assigned to each client device according to the grading score;

update the global model with the received plurality of local model parameters from at least one of the selected set of the client devices of the plurality of client devices corresponding to the good class, the average class, and the bad class;

determine an incentive for each client device, based on the contribution score and a data quality of the received plurality of local model parameters from each client device; and output the grading score, the incentive, the importance score for each of the selected devices, and a performance of the global model, wherein the output is stored and updated each time the global model is updated, wherein the CVAE is trained iteratively until there is no attackers class in the plurality of client devices, and the global model is updated, when there is no attackers class in the plurality of client devices.

\* \* \* \* \*